United States Patent [19]

Funazaki

[11] Patent Number: 5,682,458
[45] Date of Patent: Oct. 28, 1997

[54] CAMERA FOR RECORDING SHOT DATA ON A MAGNETIC RECORDING AREA OF A FILM

[75] Inventor: Fumihiro Funazaki, Asaka, Japan

[73] Assignee: Fuji Photo Film Co., Ltd., Kanagawa, Japan

[21] Appl. No.: 664,613

[22] Filed: Jun. 18, 1996

Related U.S. Application Data

[62] Division of Ser. No. 419,695, Apr. 11, 1995, Pat. No. 5,561,531.

[30] Foreign Application Priority Data

Apr. 15, 1994 [JP] Japan ................. 6-077477

[51] Int. Cl.$^6$ ............. H04N 5/84; G03B 17/24
[52] U.S. Cl. ............. 386/128; 360/3; 348/371; 396/319
[58] Field of Search ............. 386/38, 95, 117, 386/128; 348/96, 97, 207, 231, 232, 371, 373; 358/906, 909.1; 396/310, 319, 429; 360/3; H04N 5/225, 5/92, 5/76, 5/84

[56] References Cited

U.S. PATENT DOCUMENTS

| | | | |
|---|---|---|---|
| 4,555,803 | 11/1985 | Hirose | 356/335 |
| 4,574,319 | 3/1986 | Konishi | 358/906 |
| 4,607,290 | 8/1986 | Murakami | 358/342 |
| 4,736,256 | 4/1988 | Ichikawa | 358/355 |
| 4,862,200 | 8/1989 | Hicks | 348/96 |
| 4,949,115 | 8/1990 | Tejima et al. | 354/403 |
| 4,974,096 | 11/1990 | Wash | 358/906 |
| 5,023,651 | 6/1991 | Burch et al. | 348/96 |
| 5,023,711 | 6/1991 | Erhardt | 348/96 |
| 5,087,978 | 2/1992 | Hieda | 354/286 |
| 5,157,482 | 10/1992 | Cosgrove | 348/97 |
| 5,168,364 | 12/1992 | Kondo et al. | 358/906 |
| 5,250,966 | 10/1993 | Oda et al. | 351/208 |
| 5,454,096 | 9/1995 | Otsuka et al. | 386/117 |
| 5,479,226 | 12/1995 | Kazami et al. | 396/319 |
| 5,495,342 | 2/1996 | Harigaya et al. | 358/906 |
| 5,500,709 | 3/1996 | Kazami et al. | 396/310 |
| 5,526,078 | 6/1996 | Itoh et al. | 396/319 |
| 5,561,493 | 10/1996 | Takahashi | 396/48 |

*Primary Examiner*—Thai Tran
*Attorney, Agent, or Firm*—Sughrue, Mion, Zinn, Macpeak & Seas, PLLC

[57] ABSTRACT

A camera and a video filing system practicable therewith are disclosed. The camera has a body and a plurality of component parts removably mounted on the body and including a lens and a stroboscope. The body and component parts each has a respective condition data output section for outputting shooting conditions, and a respective ROM (Read Only Memory) storing a type and other inherent data beforehand. A processor reads the data from such condition data output sections and ROMs at the time of shooting and records them in a magnetic recording area formed in a silver halide sensitive type of film. As a result, images are recorded in the film together with shot data associated therewith. The video filing system automatically reads the image data and shot data out of the film and records the image data in an optical disk or similar recording medium by using the shot data as keywords, thereby constructing a video data base. The system, therefore, saves time and labor otherwise needed in inputting the keywords by hand.

7 Claims, 5 Drawing Sheets

Fig. 4

| CODE (CC) | CONTENT |
|---|---|
| 00H | BODY |
| 01H | LENS |
| 02H | STROBO |
| 03H | FILM |
| 04H | OTHERS |

Fig. 5

| FUNCTION CODE (FC) | CONTENT | CHARACTER SERIES |
|---|---|---|
| 00H | BODY NO. | FUJINONF JX-01 |
| 01H | SHOOTING DATE | 10:00 20 Aug '93 |
| 02H | SHUTTER SPEED | 1/250sec |
| 03H | | |
| 04H | | |

Fig. 6

| FUNCTION CODE (FC) | CONTENT | CHARACTER SERIES |
|---|---|---|
| 00H | LENS TYPE | FUJINONFX-03XX |
| 01H | APERTURE | F8.0 |
| 02H | ZOOM POSITION | 35mm |
| 03H | FOCUS POSITION | 3m |
| 04H | | |

Fig. 7

| FUNCTION CODE (FC) | CONTENT | CHARACTER SERIES |
|---|---|---|
| 00H | STROBO TYPE | FUJISTRBXXXX |
| 01H | MODE | MANUAL |
| 02H | RADIATION TIME | 1/16sec |
| 03H | | |
| 04H | | |

Fig. 8

| FUNCTION CODE (FC) | CONTENT | CHARACTER SERIES |
|---|---|---|
| 00H | FILM TYPE | FUJIFILM REARA |
| 01H | ISO SENSITIVITY | 100 |

Fig. 9

| FUNCTION CODE (FC) | CONTENT | CHARACTER SERIES |
|---|---|---|
| 00H | OBJECT | WOMAN |
| 01H | — | |

CAMERA FOR RECORDING SHOT DATA ON A MAGNETIC RECORDING AREA OF A FILM

This is a divisional of application Ser. No. 08/419,695 filed Apr. 11, 1995, now U.S. Pat. No. 5,561,531.

BACKGROUND OF THE INVENTION

1. Field of the Invention

The present invention relates to a camera and a video filing system practicable therewith and, more particularly, to a camera for recording images in a silver halide sensitive type of film and a video filing system for reading high-resolution image data out of the film and recording them in an optical disk or similar recording medium.

2. Description of the Background Art

Generally, images recorded in a silver halide sensitive type of film by a camera have a resolution more than several times as high as the resolution of images available with, for example, a television receiver. A Photo-CD (Compact Disk) or similar video filing system is a recent achievement in the imaging art and practicable with a camera loaded with the above-mentioned type of film. The video filing system includes a film scanner or similar high-resolution device for reading images recorded in the film by the camera. The images read by the scanner are each converted to digital image data and then written to a large capacity recording medium, e.g., optical disk. This kind of filing system frees the filed image data from fading and allows them to be faithfully reproduced with high resolution. In addition, the filed image data can be sent to a remote station by a conventional data transmission or similar technology and reproduced with high resolution there. The video filing system with these advantages is an optimal approach to construct, for example, a video data base.

When the video filing system is applied to a video data base, the locations and dates of shots, objects shot, shooting conditions and other data relating to the shots are filed together with the image data and used as keywords in the event of searches. Such data relating to shots will be referred to as shot data hereinafter, as distinguished from image data representative of images. However, the problem with the conventional video filing system is that since only image data are usually stored in the film, the shot data or search data must be put down somewhere at the time of shooting. For example, the search data must be entered on a keyboard included in the system independently of the image data.

On the other hand, a camera capable of recording character data in a silver halide sensitive type of film having a magnetic recording area has recently been proposed, as taught in Japanese patent laid-open publication Nos. 204528/1992 and 246631/1992 by way of example. This type of camera has a storage storing character data or character fonts built therein. When particular keys or push buttons arranged on the camera are sequentially operated to select characters or a predetermined series of characters, character data matching a shot are written to the magnetic recording area of the film. The character data stored in the recording area may be read out dud used as data for searching a video data base.

However, the conventional camera capable of recording character data in the film mainly relies on the user's manual operation. The camera, therefore, does not free the user from the troublesome manual input of shooting conditions which should play the role of a keyword in the event of a search of a video data base. For example, in the case of a photographic video data base, image data will be advantageously converted and reproduced if the name of a camera, the name, aperture and f-number of a lens, shutter speed, range, and the name and sensitivity of a film are entered together with a title attached to a scene and a shooting date as a keyword for searching the data base. Entering such various kinds of data on the camera or the keyboard of the system by hand is troublesome.

SUMMARY OF THE INVENTION

It is, therefore, an object of the present invention to provide a camera and a video filing system capable of electronically recording an image picked up by the camera in an optical disk or similar recording medium, thereby automating the entry of shooting conditions which occupy major part of a keyword intended for a video data base.

In accordance with the present invention, a camera system has a film chamber for receiving a silver halide sensitive type of film for recording images representative of desired objects, a camera body loaded with the film, and a plurality of component parts removably mounted on the body and including a lens and a stroboscope. The film includes a magnetic recording area for recording shot data generated at the time of shooting image by image. The body and component parts each has a respective condition data output section for outputting condition data representative of shooting conditions shot by shot, and a respective storage storing inherent data particular thereto. The body comprises a controller for reading, when catching an object on the film, the condition data and inherent data fed from the condition data output sections and storages, respectively, and recording the condition data and inherent data in the magnetic recording area of the film as the shot data.

Further, the body has an inputting section for allowing additional data relating to a shot to be manually input thereon. The controller records the additional data in the magnetic recording area of the film as the shot data together with the condition data and inherent data.

In addition, the controller reads data representative of features particular to the film and records them in the magnetic recording area of the film together with the condition data and inherent data as the shot data.

Furthermore, in accordance with the present invention, a video filing system for reading image data and shot data respectively representative of images and shooting conditions associated therewith out of a silver halide sensitive type of film including a magnetic recording area, and for recording the image data and shot data in an optical recording medium has an image data reading section for reading the image data out of the film. A data converting section converts the image data fed from the image data reading section to a predetermined type of data to be filed. A shot data reading section reads the shot data out of the magnetic recording area of the film. A feature data supply section separates part of the shot data read by the shot data reading section and which is necessary for the conversion of the image data and supplies, based on that part of the shot data, the data converting section with feature data for the conversion of the image data. A storage stores beforehand a plurality of kinds of feature data to be fed from the feature data supply section to the data converting section. A filing section sorts and files the image data converted by the data converting section on a kind basis. A search data generating section files the shot data read by the shot data reading section as search data corresponding to the image data filed by the filing section. A recording section records the image data from the filing section and the search data from the search data generating section in the optical recording medium.

The plurality of kinds of feature data stored in the storage are each assigned to a particular film on the basis of shooting conditions. The feature data supply section selectively feeds the plurality of kinds of feature data to the data converting section on the basis of, among the shot data ready by the shot data reading section, data representative of features of the film, condition data representative of shooting conditions, and data particular to a camera.

BRIEF DESCRIPTION OF THE DRAWING

The objects and features of the present invention will become more apparent from the consideration of the following detailed description taken in conjunction with the accompanying drawings in which:

FIG. 4 is a table listing specific codes particular to the embodiment and representative of shot data;

FIG. 5 is a table listing specific codes representative of shot data generated by a body included in the camera;

FIG. 6 is a table listing specific codes representative of shot data generated by a lens removably mounted on the body;

FIG. 7 is a table listing specific codes representative of shot data generated by a stroboscope also removably mounted on the body;

FIG. 8 is a table listing specific codes representative of data particular to a film; and FIG. 9 is a table listing specific codes representative of additional data entered on the camera by the user.

DESCRIPTION OF THE PREFERRED EMBODIMENTS

Figure 1:
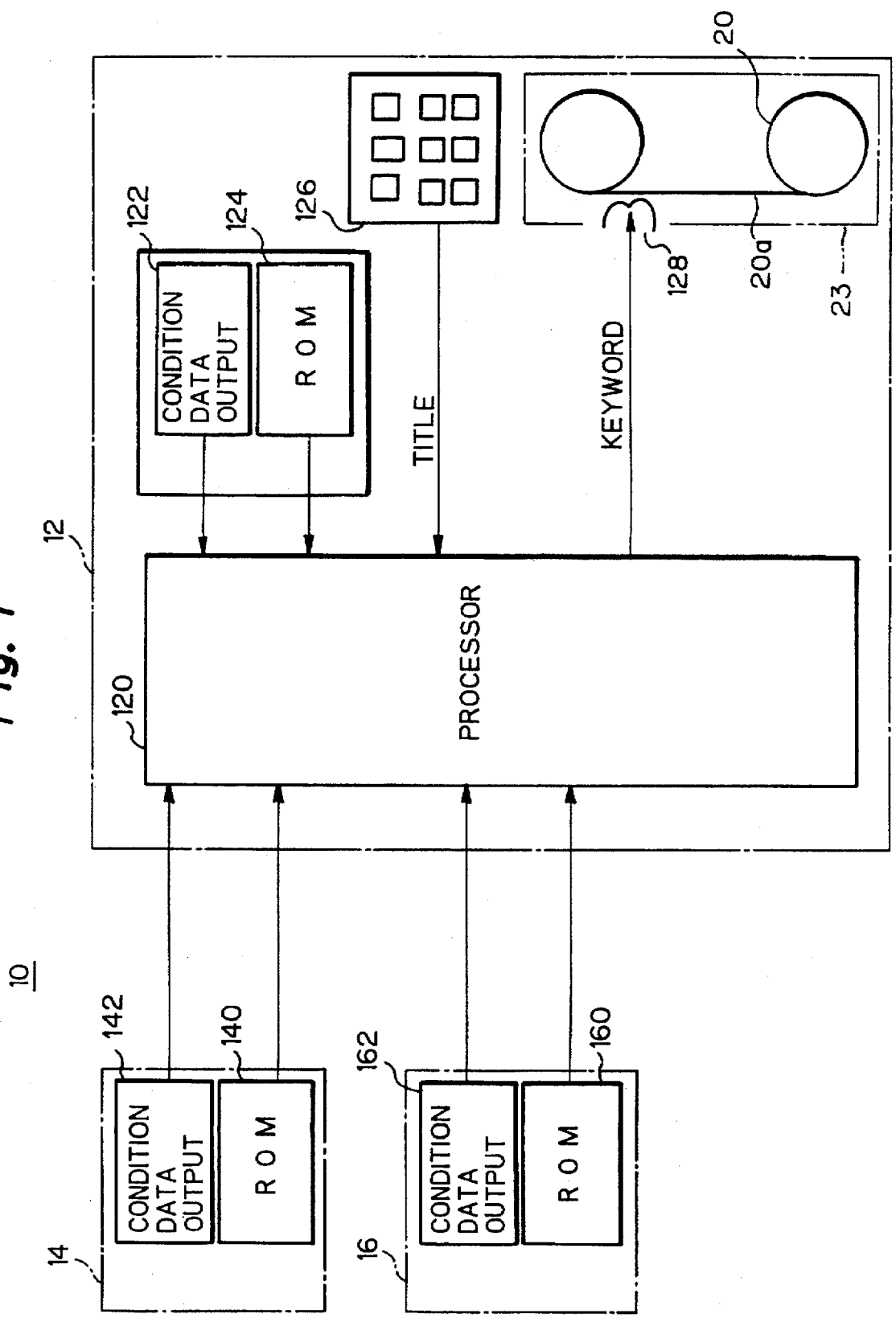
FIG. 1 is a block diagram schematically showing a camera embodying the present invention.

Referring to FIG. 1 of the drawings, a camera embodying the present invention is shown and generally designated by the reference numeral 10. It is to be noted that part of the construction and operation of the camera 10 which is not relevant to the understanding of the present invention is not shown or described. As shown, the camera 10 is made up of a body 12, a lens 14, and a stroboscope, or strobo as referred to hereinafter, 16. The lens 14 and strobo 16 are removably mounted on the body 12 and represent a plurality of component parts applicable to the body 12. The camera 10 is implemented as an autofocus (AF) camera by way of example and causes the body 12 to control the lens 14 and strobo 16 in order to effect adequate adjustment for shooting. The body 12 is loaded with a silver halide sensitive type of roll film 20 in a film chamber 23. The roll film 20 has a magnetic recording area imaginarily denoted with the reference numeral 20a. Data relating to consecutive shots, or shot data, are recorded in the magnetic recording area of the film 20, as will be described later specifically.

The body 12 includes a processor 120 for controlling the lens 14 and strobo 16 as well as various sections constituting the body 12. A condition data output section 122 outputs data representative of the conditions of the body 12 controlled by the processor 120. A ROM (Read Only Memory) 124 stores a model number and other inherent data particular to the body 12. A keyboard 126 is arranged on the body 12 to allow the user to enter desired information associated with a shot, e.g., a title or caption. A magnetic head or transducer 128 writes shot data in the magnetic recording area 20a of the film 20.

More specifically, when the body 12 of the camera 10 is loaded with a new roll film 20, the processor 120 reads codes printed or formed on the cartridge of the film 20 and representative of ISO (International Standards Organization) sensitivity and other features of the film 20. Then, the processor 120 controls the various sections thereof so as to match them to the features of the film 20. When the camera 10 is operated to shoot a scene, the processor 120 selects adequate shooting conditions in conformity to the output of the condition data output section 122. In this sense, the processor 120 plays the role of a controller for controlling the entire body 12. Particularly, in the illustrative embodiment, the processor 120 controls a procedure for recording the shooting conditions selected and the data read out of the ROM 124 in the magnetic recording area of the film 20 via the magnetic head 128.

The condition data output section 122 of the body 12 includes various sensors for photometry, range-finding and so forth, although not shown specifically. The brightness of an object to be shot, range and other factors sensed by those sensors are fed from the condition data output section 122 to the processor 12. In response, the processor 120 generates various control conditions including a shutter speed. The ROM 124 stores the model number and other inherent data of the body 12, as stated earlier. These inherent data are each represented by, for example, a predetermined series of characters or letters. In addition, the ROM 124 stores character fonts or character data matching characters or series of characters which may be entered on the keyboard 126.

The keyboard 126 includes a plurality of keys representative of alphabets or similar characters, letters and/or numerals arranged thereon. If desired, the character keys may be replaced with selection keys for selecting characters or series of characters appearing on a display also mounted on the body 12. The magnetic head 128 is positioned in the vicinity of a take-up chamber for taking up the film 20. Every time part of the film 20 is taken up corresponding to the frame of a shot after the shot, the head 128 writes shot data relating to the shot and fed from the processor 120 in the magnetic recording area of the film 20.

The lens 14 is a standard lens, telephoto lens, wide-angle lens or similar lens removably mounted on the body 12, depending on the user's intention. The zoom position, focus position and other conditions of the lens 14 are determined under the control of the processor 120. In the illustrative embodiment, each lens 14 has a respective ROM 140 and a respective condition data output section 140. The ROM 140 stores a lens type and other fixed data particular to the lens 14. The condition data output section 140 sends to the processor 120 of the body 12 the zoom position, focus position and other conditions set up under the control of the processor 120 as shot data. In the event of shooting, such shot data are read out and written to the magnetic recording area of the film 20.

The strobo 16 is also removably mounted on the body 12 and replaceable with another strobo, as desired. Each strobo 16, like each lens 14, has a respective ROM 160 and a respective condition data output section 160. The ROM 160 stores a strobo type and other inherent data of the strobo 16. The condition data output section 160 sends to the processor 120 of the body 12 an operation mode or similar condition data set up under the control of the processor 120.

The operation of the camera 10 will be described hereinafter. First, the user mounts a desired type of lens 14 and a desired type of strobo 16 to the camera body 12 and loads a film 20 in a cartridge chamber formed in the body 12. Then, the processor 120 reads codes printed on the cartridge of the film 20 and representative of ISO sensitivity and other data particular to the film 20. The processor 120 initializes the lens 14 and strobo 16 on the basis of the codes read from the cartridge. When the user directs the lens 14 at a desired object and then presses a release button provided on the body 12 halfway, the condition data output section 122 sends signals representative of the brightness of the object and range sensed by the sensors thereof to the processor 120. In response, the processor 120 computes adequate exposure and other factors and then selects an optimal shutter speed, lens position, strobo operation mode and so forth. Subsequently, the user presses the release button to the deepest position. As a result, a shutter built in the body 12 is released to catch the object on the film 20.

On the completion of the shot, the processor 120 reads the inherent data out of the ROMs 124, 140 and 160 of the body 12, lens 14, and strobo 16, respectively. At the same time, the processor 120 receives condition data associated with the shot from the condition data output sections 122, 142 and 162. The processor 120 records such condition data in the magnetic recording area of the film 20 via the head 128. At this instant, the operator operates the keyboard 126 to sequentially input a title, caption or similar additional data relating to the scene or object picked up by the camera 10. In response, the processor 120 reads data representative of characters or a series of characters and matching the input from the keyboard 126 out of the ROM 124 and writes them in the magnetic recording area 20a of the film 20 via the head 128. In addition, the processor 120 records data indicative of the features, or attributes, of the film 20 in the recording area of the film 20.

Figure 3:
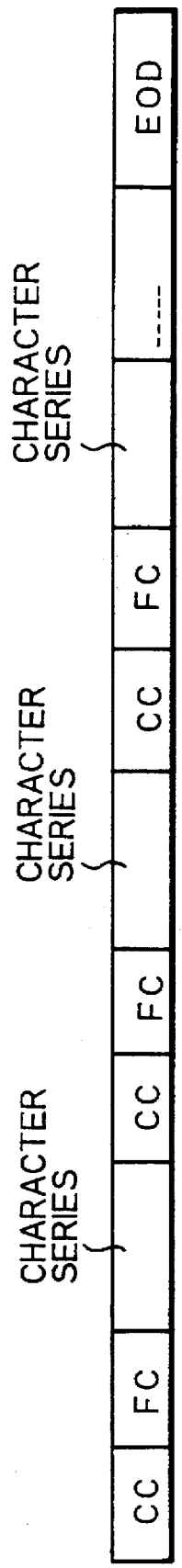
FIG. 3 shows data recorded in the magnetic recording area of a silver halide sensitive type of film in accordance with the present invention.

As stated above, every time the camera 10 is operated to shoot a scene, it records in the magnetic recording area of the film 20 the various kinds of shot data including the condition data fed from the condition data output sections 122, 142 and 162, the types and other inherent data read out of the ROMs 124, 140 and 160, the title or the like attached to the scene or object, and the features of the film 20. FIG. 3 shows a specific format in which such shot data are recorded in the recording area of the film 20. As shown, the recording area stores a component code CC, a function code FC and a character series in this order in association with each component part. As tabulated in FIG. 4, the component code is "00H" assigned to the camera body 12, "00H" assigned to the lens 14, "01H" assigned to the lens 14, "02H" assigned to the strobo 16, "03H" assigned to the film 20, or "04H" assigned to the other component parts. The letter "H" denotes a code hexadecimal. Each component code CC is followed by a function code FC indicative of the function of the component part, and a character series representative of the content of the function.

FIG. 5 shows specific shot data generated within the camera body 12 and recorded in the film 20. As shown, the shot data consists of the model number of the body 12 and represented by "00H", character data following the code "00H" and read out of the ROM 124, shooting date represented by "01H", and character data following the code "01H" and generated by the processor 120. The shooting date is followed by a shutter speed "02H" and character series representative of the output of the shot data output section 122. As shown in FIG. 6 specifically, the shot data from the lens 14 consists of the model number of the lens 14 and represented by "00H", character data following the code "00H" and read out of the ROM 140, aperture represented by "01H", and character data following the code "01H" and also read out of the ROM 140. Further, the zoom position and focus position of the lens 14 are respectively represented by codes "02H" and "03H" and followed by the condition data generated by the condition data output section 142. As shown in FIG. 7 specifically, the shot data from the strobo 16 consists of the model number of the strobo 16 and represented by "00H", character data following the code "00H" and read out of the ROM 160, operation mode represented by "01H", character data following the code "01H", radiation time represented by "02H", and character data following the code "02H". These characters following the codes "01H" and "02H" are generated by the condition data output section 162.

FIG. 8 shows specific function codes assigned to the film 20. As shown, the type and the ISO sensitivity of the film 20 are respectively represented by function codes "00H" and "01H", and each is followed by character data representative of the content thereof. Further, FIG. 9 shows a specific character series, i.e., a title entered on the keyboard 126 and represented by a function code "00H".

Figure 2:
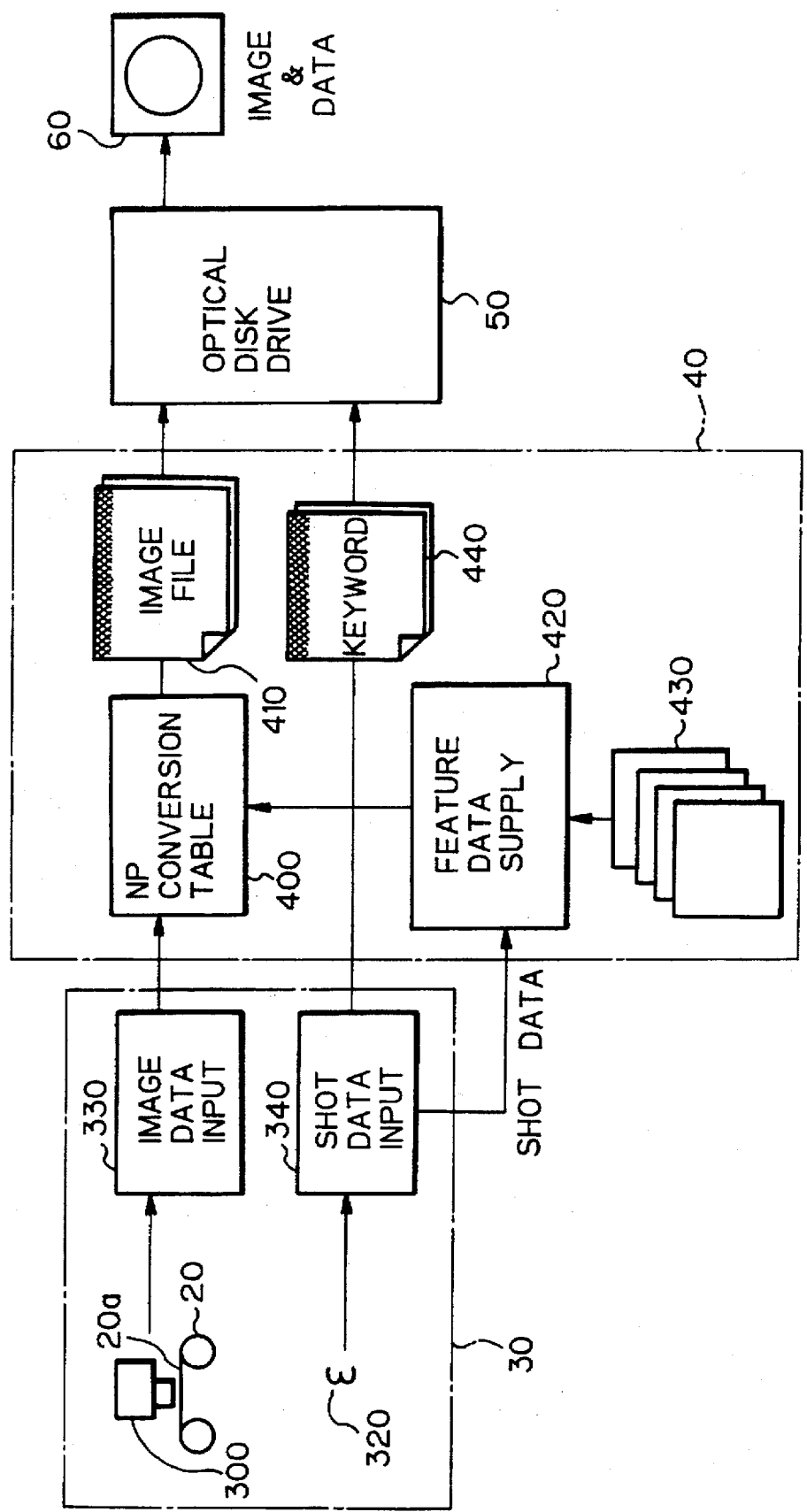
FIG. 2 is a block diagram schematically showing a video filing system practicable with the camera shown in FIG. 1.

A reference will be made to FIG. 2 for describing a video filing system practicable with the camera 10. Briefly, the video filing system reads the image data and shot data out of the roll film 20 exposed by the camera 10 and constructs a photograph or picture data base with such data. As shown, the system is generally made up of a film scanner 30, a data editing unit 40, and an optical disk drive 50 loaded with an optical disk 60. The film scanner 30 scans the film 20 to read the image data recorded therein. The data editing unit 40, implemented by a computer or the like, is loaded with software for editing the image data read by the film scanner 30. The disk drive 50 writes the edited image data in the optical disk 60.

Specifically, the film scanner 30 has an optical head or transducer 300 including a CCD (Charge Coupled Device) image sensor or similar image sensor capable of reading a plurality of pixels of image data out of the film 20 at a time. An image data input section 330 drives the optical head 300 and delivers the resulting image data to the data editing unit 40. In the illustrative embodiment, the film scanner 30 further includes a magnetic head or transducer 320 for reading the shot data out of the magnetic recording area 20a of the film 20, and a shot data input section 340 for driving the head 320 and delivering the resulting shot data to the data editing unit 40.

In the embodiment, the data editing unit 40 has a negative-to-positive (NP) conversion table 400 which transforms the negative image data from the input section 330 of the scanner 30 to positive image data, thereby producing an image file 410. A feature data supply section 420 supplies, based on the shot data from the shot data input section 340, the NP conversion table 400 with feature data necessary for negative-to-positive conversion. A data storage 430 stores beforehand and on a film basis feature data to be selected by the feature data supply section 420.

The image file 410 edited by the data editing unit 40 and a keyword, or shot data, 440 associated therewith are fed from the unit 40 to the optical disk drive 50. The disk drive 50 records them in the optical disk 60 in the from of ISO codes or similar preselected codes.

In operation, the film 20, storing images and shot data relating thereto, is developed and then loaded in the film scanner 30. The scanner 30 reads the image data out of the film 20 with the optical head 300 and reads the shot data out of the magnetic recording area 20a of the film 20 with the magnetic head 320. The image data and shot data sent to the data editing unit 40 via the image data input section 330 and shot data input section 340, respectively. In the data editing unit 40, the feature data supply section 420 separates from the shot data the data representative of the type or similar feature of the film 20 and the data representative of the shutter speed, lens position, focus position, whether or not the strobo 16 was used, and other shooting conditions. Subsequently, the feature data supply section 420 reads feature data matching the shot data out of the storage 430 and supplies them to the NP conversion table 400. In response, the NP conversion table 400 transforms the negative image data from the scanner 30 to adequate positive image data, thereby forming the image file 410. At the same time, the shot data from the film scanner 30 are transformed into the keyword 440. The image file 410 and keyword 410 are sent to the disk drive 50 as data corresponding to a particular image. In this manner, the images or pictures caught by the camera 10 are sequentially recorded in the disk 60 to constitute a picture data base.

As stated above, the video filing system reads image data out of the film 20 and converts them on the basis of the shot data also stored in the film, e.g., film features and shooting conditions. This implements a picture data base storing adequately converted image data. The magnetic head 320 automatically reads the shot data out of the film 20 and allows them to be recorded as the keywords 440 each corresponding to one of the images. Hence, images accurately matching the respective shooting conditions can be reproduced form the disk 60.

In summary, it will be seen that the present invention provides a camera and a video filing system practicable therewith which record shot data in a film together with image data and thereby automates the input of shot data which occupies a major part of the input of keywords to a video data base. Further, at the time of digital image conversion following the development of the film, an optimal conversion algorithm can be selected on the basis of the shot data recorded in the magnetic recording area of the film.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A camera system comprising:

a film chamber for receiving a silver halide sensitive type of film for recording images representative of desired objects;

a camera body loaded with said film; and a plurality of component parts removably mounted on said camera body and including a lens and a stroboscope;

said film including a magnetic recording area for recording shot data generated at the time of shooting image by image;

said camera body and said plurality of component parts each comprising a respective condition data output section for outputting condition data representative of shooting conditions shot by shot, and a respective storage storing inherent data particular thereto;

said camera body comprising a controller for reading, when catching an object on said film, said condition data and said inherent data fed from said respective condition data output section and said respective storage, respectively, and recording said condition data and said inherent data in said magnetic recording area of said film as said shot data.

2. A camera system in accordance with claim 1, wherein said camera body comprises inputting means for allowing additional data relating to a shot to be manually input thereon, said controller recording said additional data in said magnetic recording area of said film as said shot data together with said condition data and said inherent data.

3. A camera system in accordance with claim 1, wherein said controller reads data representative of features particular to said film and records said data in said magnetic recording area of said film together with said condition data and said inherent data as said shot data.

4. The camera system in accordance with claim 1, wherein the inherent data stored in the storage of said camera body includes a camera model number.

5. The camera system in accordance with claim 1, wherein the inherent data stored in the storage of said lens includes a lens type.

6. The camera system in accordance with claim 1, wherein the inherent data stored in the storage of said stroboscope includes a stroboscope type.

7. The camera system in accordance with claim 1, wherein the storage of said camera body, the storage of said lens and the storage of said stroboscope are read only memories.

* * * * *